(12) United States Patent
Shinoda et al.

(10) Patent No.: US 10,937,146 B2
(45) Date of Patent: Mar. 2, 2021

(54) IMAGE EVALUATION METHOD AND IMAGE EVALUATION DEVICE

(71) Applicant: Hitachi High-Tech Corporation, Tokyo (JP)

(72) Inventors: Shinichi Shinoda, Tokyo (JP); Masayoshi Ishikawa, Tokyo (JP); Yasutaka Toyoda, Tokyo (JP); Yuichi Abe, Tokyo (JP); Hiroyuki Shindo, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 128 days.

(21) Appl. No.: 16/252,061

(22) Filed: Jan. 18, 2019

(65) Prior Publication Data
US 2019/0228522 A1    Jul. 25, 2019

(30) Foreign Application Priority Data

Jan. 22, 2018  (JP) .................................. 2018-007803

(51) Int. Cl.
*G06T 7/00* (2017.01)
*G06N 20/00* (2019.01)
(Continued)

(52) U.S. Cl.
CPC ............ *G06T 7/0006* (2013.01); *G06K 9/036* (2013.01); *G06K 9/2054* (2013.01); *G06N 20/00* (2019.01);
(Continued)

(58) Field of Classification Search
CPC .................. G06T 7/0006; G06T 7/001; G06T 2207/20081; G06T 2207/20084;
(Continued)

(56) References Cited

U.S. PATENT DOCUMENTS

| 7,026,615 | B2 * | 4/2006 | Takane | ..................... | H01J 37/28 |
| | | | | | 250/310 |
| 8,180,140 | B2 * | 5/2012 | Yang | ................. | G01N 21/95607 |
| | | | | | 382/144 |

(Continued)

FOREIGN PATENT DOCUMENTS

| JP | 2011-17705 A | 1/2011 |
| JP | 2013-98267 A | 5/2013 |

*Primary Examiner* — Carol Wang
(74) *Attorney, Agent, or Firm* — Crowell & Moring LLP

(57) ABSTRACT

The image evaluation device includes a design data image generation unit that images design data; a machine learning unit that creates a model for generating a design data image from an inspection target image, using the design data image as a teacher and using the inspection target image corresponding to the design data image; a design data prediction image generation unit that predicts the design data image from the inspection target image, using the model created by the machine learning unit; a design data image generation unit that images the design data corresponding to the inspection target image; and a comparison unit that compares a design data prediction image generated by the design data prediction image generation unit and the design data image. As a result, it is possible to detect a systematic defect without using a defect image and generating misinformation frequently.

18 Claims, 20 Drawing Sheets

(51) Int. Cl.
*G06K 9/03* (2006.01)
*G06K 9/20* (2006.01)

(52) U.S. Cl.
CPC .... *G06T 7/001* (2013.01); *G06T 2207/10061* (2013.01); *G06T 2207/20081* (2013.01); *G06T 2207/20084* (2013.01); *G06T 2207/30148* (2013.01)

(58) Field of Classification Search
CPC .......... G06T 2207/10061; G06T 2207/30148; G06N 20/00; G06N 3/0454; G06N 3/08; G06K 9/036; G06K 9/2054
See application file for complete search history.

(56) References Cited

U.S. PATENT DOCUMENTS

| | | | |
|---|---|---|---|
| 8,285,056 B2* | 10/2012 | Taguchi | G06T 7/001 382/203 |
| 2009/0238441 A1* | 9/2009 | Yamashita | G06T 7/001 382/144 |
| 2010/0303334 A1 | 12/2010 | Kitamura et al. | |
| 2012/0207397 A1* | 8/2012 | Nagatomo | G06K 9/6203 382/218 |
| 2016/0275365 A1* | 9/2016 | Yoshikawa | G06T 3/40 |
| 2017/0316557 A1* | 11/2017 | Inoue | G06T 7/001 |
| 2018/0101941 A1* | 4/2018 | Matsumoto | G03F 1/36 |

\* cited by examiner

FIG. 3
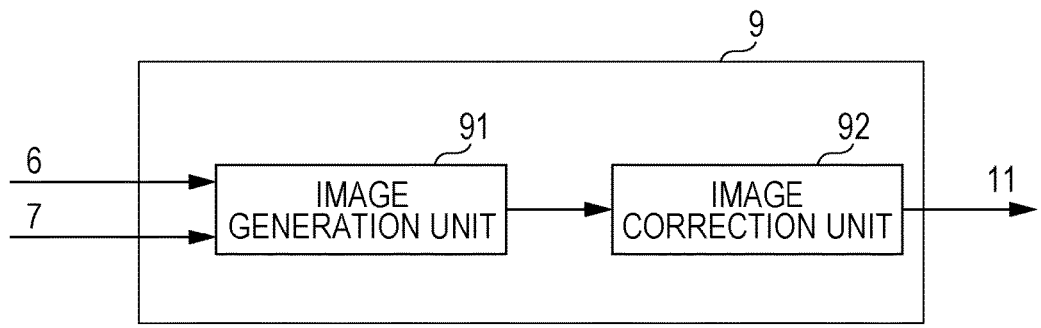
FIG. 4
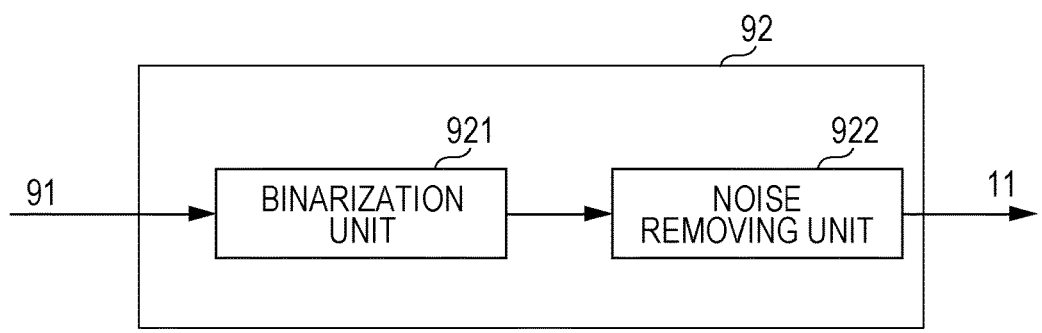
FIG. 5A  FIG. 5B  FIG. 5C  FIG. 5D
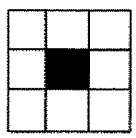 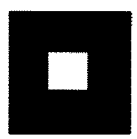 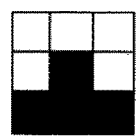 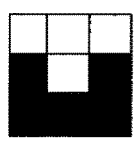

FIG. 24
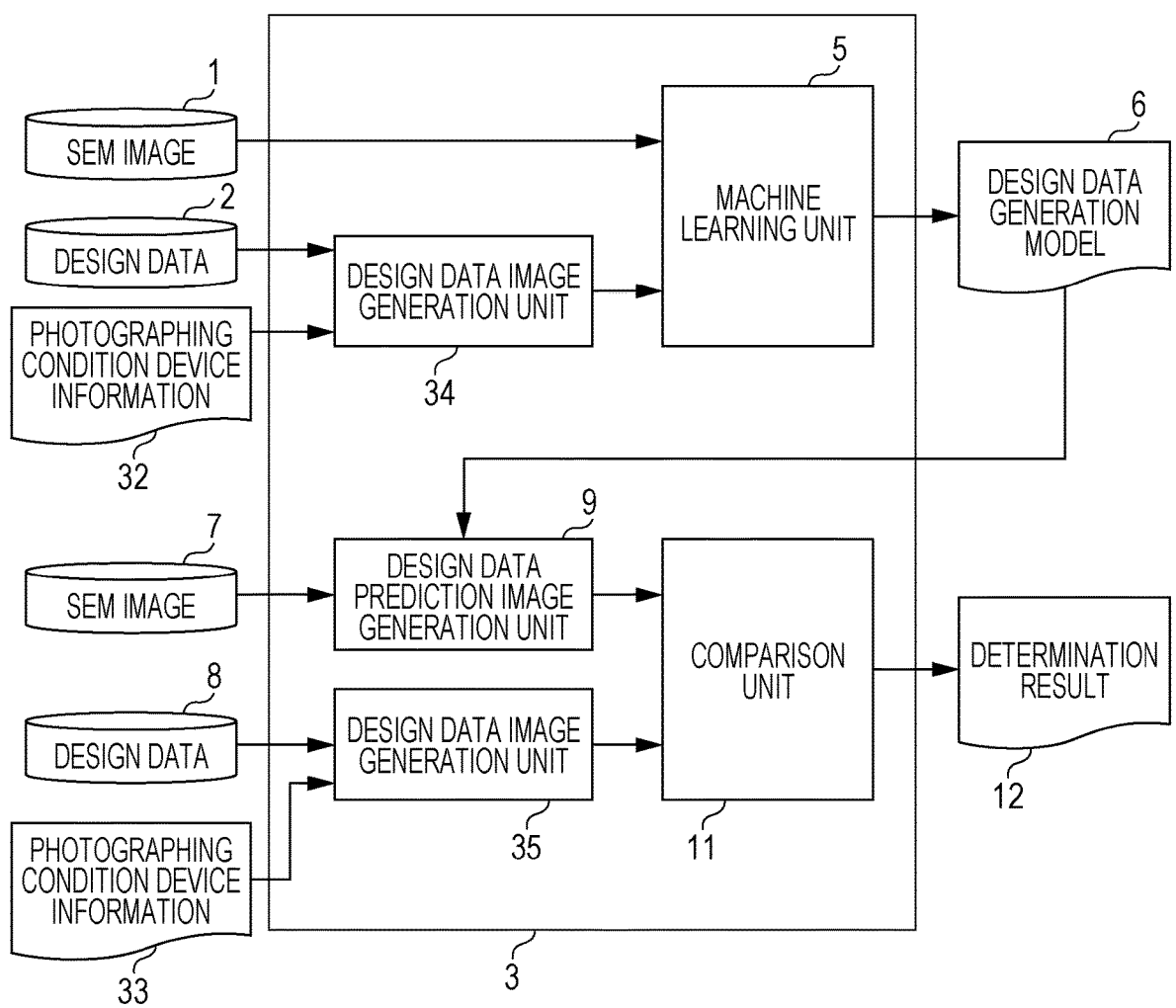
FIG. 25A    FIG. 25B    FIG. 25C
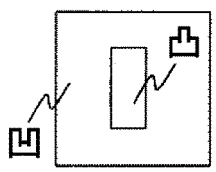    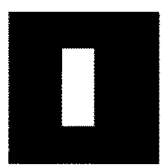    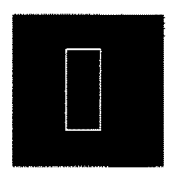

IMAGE EVALUATION METHOD AND IMAGE EVALUATION DEVICE

BACKGROUND OF THE INVENTION

1. Field of the Invention

The present invention relates to an image evaluation method and an image evaluation device for inspecting a semiconductor pattern.

2. Description of the Related Art

According to miniaturization of a semiconductor circuit pattern, a resolution of an exposure apparatus reaches a limit and it becomes difficult to form a circuit pattern as designed on a wafer. In a circuit pattern formed on a semiconductor wafer, a defect such as a line width deviating from a design value, contraction occurring in a tip of the pattern, and a shape change of a corner or a base of the pattern is likely to occur. The defect is called a systematic defect and occurs commonly in all dies, so that it is difficult to detect the defect in a method of performing comparison between adjacent dies (die-to-die comparison).

On the other hand, JP 2011-17705 A discloses a method of comparing an inspection target pattern with design data instead of comparing the adjacent dies. Specifically, a contour line is extracted from an image obtained by photographing the inspection target pattern, the contour line is compared with the design data represented by a line segment or a curve, and when a degree of deviation between the contour line and the design data is large, this is determined as a defect. Since the comparison with the design data is performed, the systematic defect commonly occurring in all the dies can also be detected in principle.

However, many deviations of shapes (such as differences of roundness of corners) from the design data that are not the defect exist on the pattern transferred onto the wafer. In the method disclosed in JP 2011-17705 A, when the shape deviation between the contour line extracted from the inspection target pattern and the design data represented by the line segment or the curve is large, this is determined as the defect. For this reason, it is difficult to distinguish the shape deviation that is not the defect and the systematic defect.

As a method for solving this problem, there is JP 2013-98267 A. Specifically, one or more feature amounts are previously extracted from the design data and the inspection target pattern and a boundary surface for identifying the defect and normality is created on a feature amount space by teaching, thereby making it possible to distinguish the shape deviation that is not the defect and the systematic defect.

SUMMARY OF THE INVENTION

In the prior art documents, a defect image and a normal image are required to create the identification boundary surface. It takes time and effort to find, photograph, and acquire a pattern near the identification boundary and it is thought that it is not easy to acquire an image including the identification boundary surface, particularly, a defect pattern image, even if past data is used.

An object of the present invention is to detect a systematic defect without using a defect image and generating misinformation frequently, in defect detection in semiconductor inspection using machine learning.

As an aspect for achieving the above object, the present invention provides an image evaluation method and an image evaluation device. The image evaluation device includes a design data image generation unit that images design data; a machine learning unit that creates a model for generating a design data image from an inspection target image, using the design data image as a teacher and using the inspection target image corresponding to the design data image; a design data prediction image generation unit that predicts the design data image from the inspection target image, using the model created by the machine learning unit; a design data image generation unit that images the design data corresponding to the inspection target image; and a comparison unit that compares a design data prediction image generated by the design data prediction image generation unit and the design data image.

According to the above configuration, it is possible to detect a systematic defect without using a defect image and generating misinformation frequently.

BRIEF DESCRIPTION OF THE DRAWINGS

FIG. 3 is a diagram showing an embodiment of a design data prediction image generation unit;

FIG. 4 is a diagram showing an embodiment of an image correction unit;

FIGS. 5A to 5D are diagrams showing an example of a pattern removed by a noise removing unit;

FIGS. 7A to 7C are diagrams showing an image of a local region of a template creation unit;

FIG. 24 is a diagram showing an embodiment of image evaluation processing;

FIGS. 25A to 25C are diagrams showing an example of an appearance based on a photographing condition and device information;

DESCRIPTION OF THE PREFERRED EMBODIMENTS

An image evaluation device exemplified in an embodiment described below relates to an image evaluation method and an image evaluation device for detecting a systematic defect without generating misinformation frequently using an inspection target image and design data.

As a concrete example, an example of removing shape deviation by returning an inspection target image to a design data image using machine learning and detecting a defect by shape comparison with the design data image is shown.

Hereinafter, a device and a measurement and inspection system having a function of detecting the systematic defect without generating the misinformation frequently using the inspection target image and the design data will be described using the drawings.

More specifically, a device and a system including a critical dimension-scanning electron microscope (CD-SEM) that is one type of measurement device will be described.

In the following description, a charged particle beam device is exemplified as a device for forming an image and an example using an SEM is described as one aspect thereof, but the present invention is not limited thereto. For example, a focused ion beam (FIB) device for forming an image by scanning an ion beam on a sample may be adopted as the charged particle beam device. However, in order to accurately measure a pattern where miniaturization is advanced, extremely high magnification is required. For this reason, it is desirable to use the SEM that is superior to the FIB device in terms of a resolution in general.

Figure 19:
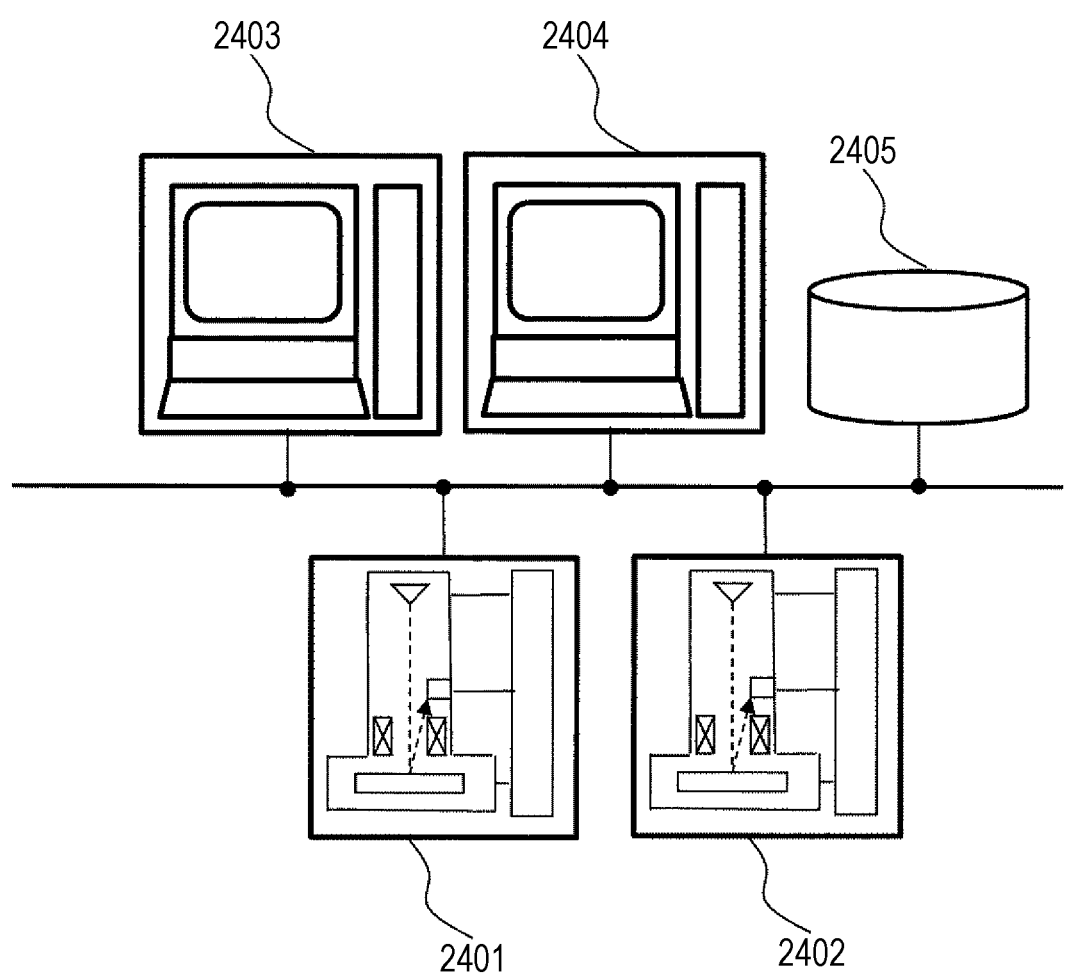
FIG. 19 is a diagram showing an example of a semiconductor measurement system.

FIG. 19 is a schematic explanatory view of a measurement and inspection system in which a plurality of measurement or inspection devices are connected to a network. The system has a configuration in which a CD-SEM 2401 that measures a pattern dimension of a semiconductor wafer, a photomask, or the like and a defect inspection device 2402 that radiates an electron beam to a sample to acquire an image and extracts a defect on the basis of a comparison between the image and a reference image registered in advance are connected to the network. In addition, a condition setting device 2403 that sets a measurement position or a measurement condition on design data of a semiconductor device, a simulator 2404 that simulates a result of the pattern on the basis of the design data of the semiconductor device and a manufacturing condition of a semiconductor manufacturing device, and a storage medium 2405 that stores the design data in which layout data of the semiconductor device or the manufacturing condition is registered are connected to the network.

The design data is expressed in, for example, a GDS format or an OASIS format and is stored in a predetermined format. The design data may be of any type as long as software that displays the design data can display the format and can be handled as graphic data. The storage medium 2405 may be incorporated in a control device of the measurement device and the inspection device, the condition setting device 2403, or the simulator 2404.

Each of the CD-SEM 2401 and the defect inspection device 2402 is provided with a control device and control necessary for each device is performed. However, the control device may be mounted with a function of the simulator or a function of setting the measurement condition or the like.

In the SEM, an electron beam emitted from an electron source is focused by a plurality of steps of lenses and the focused electron beam is scanned one-dimensionally or two-dimensionally on the sample by a scanning deflector. Secondary electrons (SE) or backscattered electrons (BSE) emitted from the sample by electron beam scanning are detected by a detector and are stored in a storage medium such as a frame memory in synchronization with scanning of the scanning deflector. An image signal stored in the frame memory is integrated by an operation device mounted in the control device. The scanning by the scanning deflector is possible for arbitrary sizes, positions, and directions.

The above control and the like are performed by the control device of each SEM. As a result of scanning of the electron beam, an obtained image or signal is sent to the condition setting device 2403 via a communication network. In this example, the case where the control device for controlling the SEM and the condition setting device 2403 are provided separately is described. However, the present invention is not limited thereto and device control and measurement processing may be performed collectively by the condition setting device 2403 and SEM control and measurement processing may be performed together by each control device.

A program for executing the measurement processing is stored in the condition setting device 2403 or the control device and measurement or operation is performed according to the program.

In addition, the condition setting device 2403 is provided with a function of creating a program (recipe) for controlling the operation of the SEM on the basis of design data of a semiconductor and functions as a recipe setting unit. Specifically, a position and the like for performing processing necessary for the SEM, such as a desired measurement point, auto focusing, auto stigma, and an addressing point, on the design data, contour line data of the pattern, simulated design data is set and a program for automatically controlling a sample stage or a deflector of the SEM is created on the basis of the setting. In order to create a template to be described later, a processor for extracting information of a region to be a template from the design data and creating the template on the basis of the extracted information or a program for causing a general-purpose processor to create the template is incorporated or stored.

Figure 20:
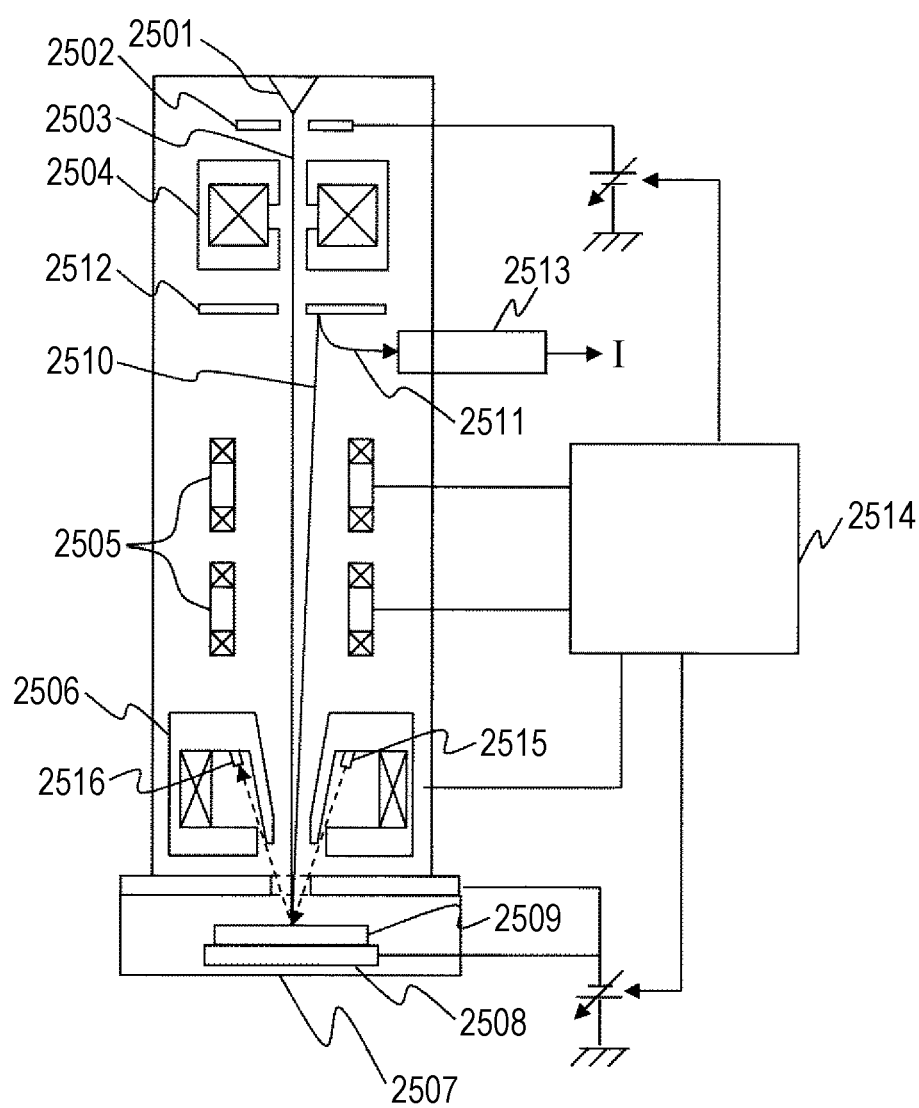
FIG. 20 is a schematic explanatory view of a scanning electron microscope.

FIG. 20 is a schematic configuration diagram of a scanning electron microscope. An electron beam 2503 emitted from an electron source 2501 by an extraction electrode 2502 and accelerated by an acceleration electrode not shown in the drawings is narrowed by a condenser lens 2504 to be one form of a focusing lens and is then scanned on a sample 2509 one-dimensionally or two-dimensionally by a scanning deflector 2505. The electron beam 2503 is decelerated by a negative voltage applied to an electrode incorporated in a sample stage 2508, is focused by a lens action of an objective lens 2506, and is radiated to the sample 2509.

When the electron beam 2503 is radiated to the sample 2509, electrons 2510 such as secondary electrons and backscattered electrons are emitted from a radiation point. The emitted electrons 2510 are accelerated in an electron source direction by an acceleration action based on the negative voltage applied to the sample, collide with a conversion electrode 2512, and generate secondary electrons 2511. The secondary electrons 2511 emitted from the conversion electrode 2512 are captured by a detector 2513 and an output I of the detector 2513 changes according to a captured secondary electron amount. According to the output I, brightness of a display device not shown in the drawings changes. For example, when a two-dimensional image is formed, an image of a scanning region is formed by synchronizing a deflection signal to the scanning deflector 2505 and the output I of the detector 2513. In a scanning electron microscope exemplified in FIG. 22, a deflector (not shown in the drawings) for moving a scanning region of an electron beam is provided.

Figure 22:
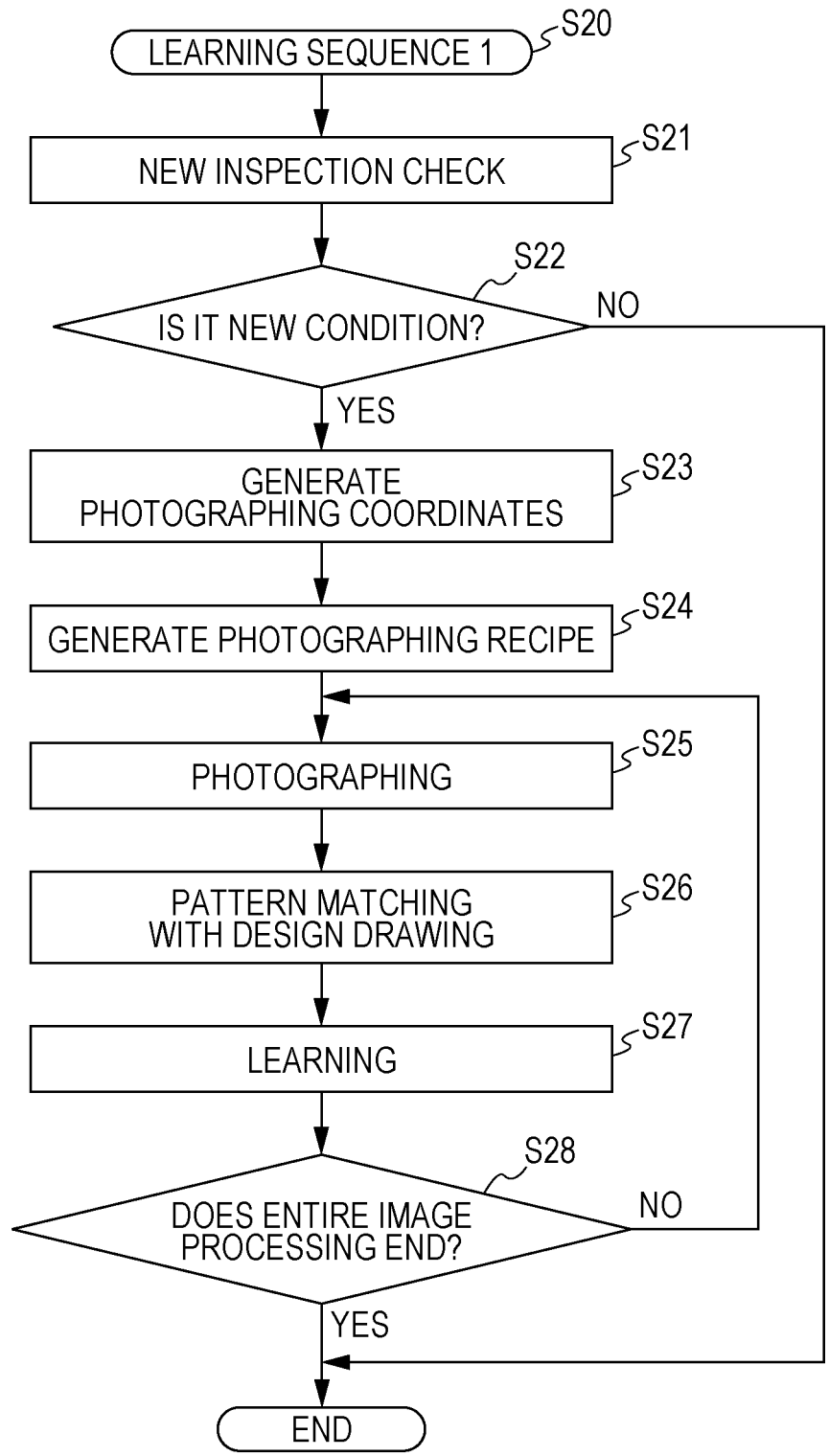
FIG. 22 is a diagram showing an embodiment of a learning sequence.

In an example of FIG. 22, although the case in which the electrons emitted from the sample are converted once by the conversion electrode and are detected is described, it is needless to say that the present invention is not limited to this configuration. For example, a configuration in which an electron multiplier or a detection surface of a detector is disposed on an orbit of the accelerated electron can be adopted. A control device 2514 has a function of controlling each component of the scanning electron microscope and forming an image on the basis of the detected electron or a function of measuring a pattern width of a pattern formed on the sample on the basis of an intensity distribution of the detected electron called a line profile.

Next, an aspect of an image evaluation unit 3 for defect detection using machine learning will be described. The image evaluation unit 3 can be incorporated in the control device 2514 or can execute an image evaluation by an operation device provided with an image processing function and can execute the image evaluation by an external operation device (for example, the condition setting device 2403) via the network.

Figure 1:
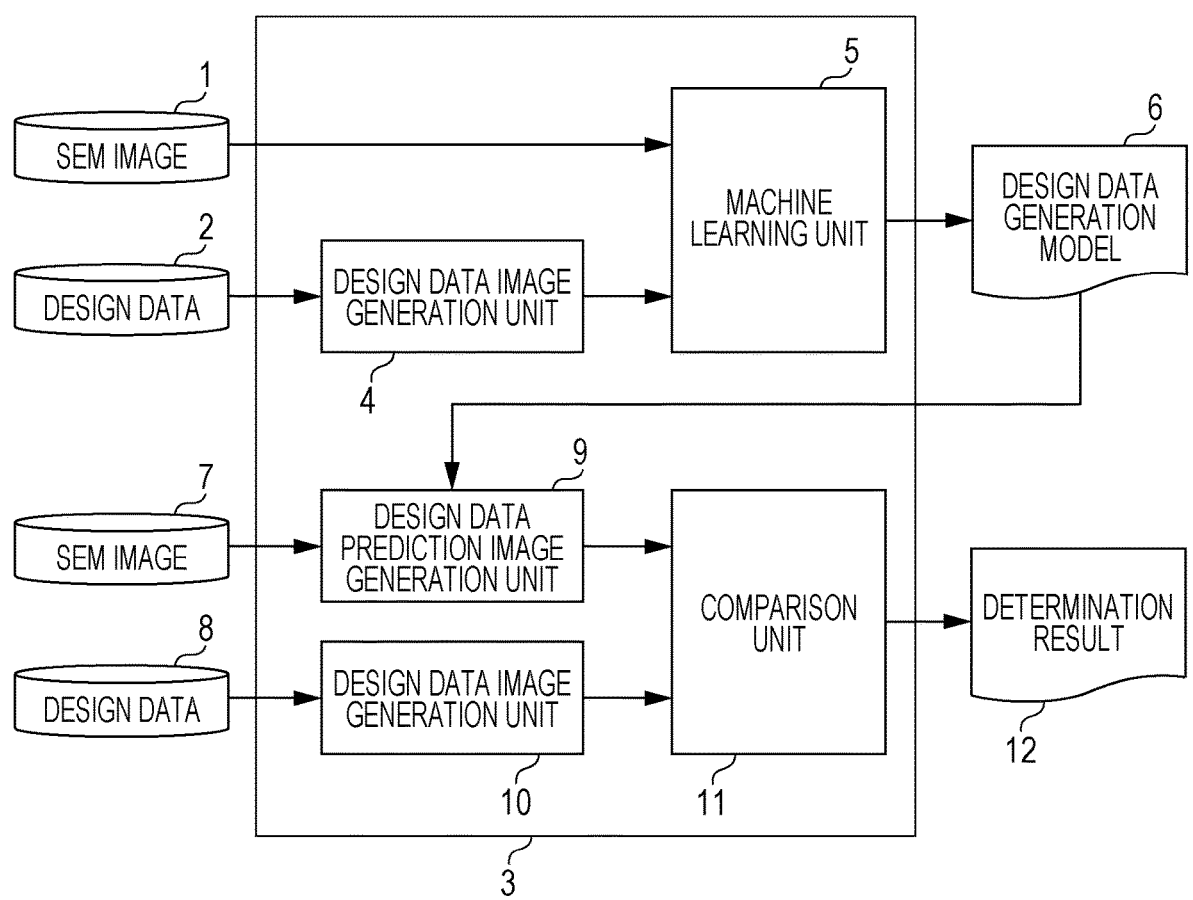
FIG. 1 is a diagram showing an embodiment of an image evaluation device.

FIG. 1 is a diagram showing an example of an image evaluation device that detects a defect using an inspection target image (SEM image) and design data.

An image evaluation device 3 executes processing at the time of learning and processing at the time of inspection.

At the time of the learning before the inspection, a model for generating a design data image from an SEM image is created using the SEM image 1 and design data 2 by machine learning.

Specifically, a design data generation model 6 for creating a design data image from the design data 2 corresponding to the SEM image 1 of FIG. 1 by a design data image generation unit 4 and creating a design data image from the SEM image 1 by a machine learning unit 5 using the SEM image 1 and the design data image is created.

At the time of inspection, a design data prediction image corresponding to an SEM image 7 is created by a design data prediction image generation unit 9 using the design data generation model 6 created at the time of learning and the SEM image 7. Further, a design data image generation unit 10 creates a design data image from design data 8 corresponding to the SEM image 7. In addition, the design data prediction image and the design data image are compared by a comparison unit 11 and a determination result 12 on whether or not the defect is normal is output.

Figure 2A:
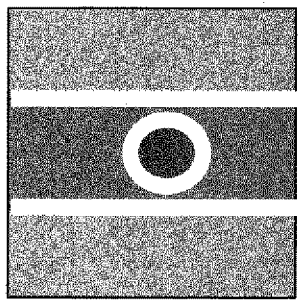
FIGS. 2A to 2C are diagrams showing an example of a design data image.
Figure 2B:
Figure 2C:
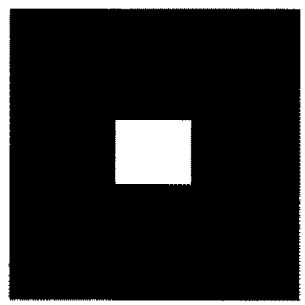

The design data image generation unit 4 creates design data images shown in FIGS. 2B and 2C from the design data 2 corresponding to the SEM image 1 shown in FIG. 2A. The design data 2 is data having a vertex coordinate information of a circuit pattern shape and the pattern shape can be represented by connecting the vertex coordinates by lines in clockwise or counterclockwise order. Basically, vertex coordinate information of one pattern is enumerated on one line. Since the shape of the pattern becomes a closed figure, the coordinates of a start point and an end point become the same. The order of enumeration of the vertex coordinate information of the closed figure is clockwise and counterclockwise, thereby showing whether a region where the pattern exists is the inside or the outside of the closed figure. In the design data image generation unit 4, a region where there is a pattern is displayed with a white color, a region where there is no pattern is displayed with a black color, and a design data image is generated as a binary image.

Depending on a process, a plurality of layers of patterns may appear to be mixed in the SEM image. The design data has pattern information for each layer and the design data image is created by dividing the design data into upper and lower layers using the information.

The machine learning unit 5 creates a model for generating the design data image from the SEM image by using the SEM image and the design data image corresponding to the design data as teacher data. Specifically, it can be realized by performing learning so that an output becomes the design data image of the teacher data, using the SEM image as an input and using (CNN) composed of dozens of convolution layers. For example, it can be realized by identifying whether a target pixel is a pattern or not in pixel units, using a network such as VGG16 and SegNet. In this case, the design data generation model 6 is information including weights of filters of the convolutional layers of the CNN optimized for generating the design data image from the SEM image.

FIG. 3 shows an embodiment of the design data prediction image generation unit 9 used at the time of the inspection. The design data prediction image generation unit 9 can include an image generation unit 91 and an image correction unit 92. The image generation unit 91 can be realized by the CNN of the machine learning unit 5 and generates a design data prediction image from the SEM image 7 using the design data generation model 6. For the design data of the binary image, the design data prediction image obtained by identification may be a multivalued image of 0-255 based on the probability obtained at the time of the identification or a binary image.

The image correction unit 92 removes noise generated by a prediction error with respect to the design data prediction image generated by the image generation unit 91.

As the prediction error, if many images with many repetitive patterns are learned at the time of learning, periodicity is learned, a pattern is output at a specific period even though there is no pattern, and an error occurs. In addition, the error may occur as noise on a pattern edge due to roughness of a pattern edge and the like. In such a case, since a size of the pattern is often smaller than a size of a normal pattern, it is necessary to perform removing on the basis of a standard of a size of an actual pattern.

FIG. 4 shows one embodiment of the image correction unit 92. Here, a pattern that does not satisfy the standard of the actual pattern is removed from the design data prediction image, on the basis of information of the pattern of the design data, for example, information such as the minimum width and the size of the pattern. The image correction unit 92 includes a binarization unit 921 and a noise removing unit 922 and the binarization unit 921 binarizes the design data prediction image. In the noise removing unit 922, a 3×3 block pattern shown in FIGS. 5A to 5D is detected and a target pixel is inverted. A pixel size of one block is set to a value smaller than the minimum width of the pattern and if there is a pattern having a width smaller than the minimum width of the pattern, the pattern is removed. In a pattern of FIG. 5A, a center block is changed from black to white. A pattern of FIG. 5B is an inversion pattern thereof and a center block is changed from black from white in the pattern. In a pattern of FIG. 5C, a center block is changed from black to white. A pattern of FIG. 5D is an inversion pattern thereof and a center block is changed from black to white in the pattern. In FIGS. 5C and 5D, there is pattern rotation and similarly, a center block is changed, so that a region not satisfying the standard of the actual pattern is removed.

The design data image generation unit 10 for generating the design data image from the design data 8 corresponding to the SEM image 7 can be realized in the similar manner to the design data image generation unit 4.

Figure 6:
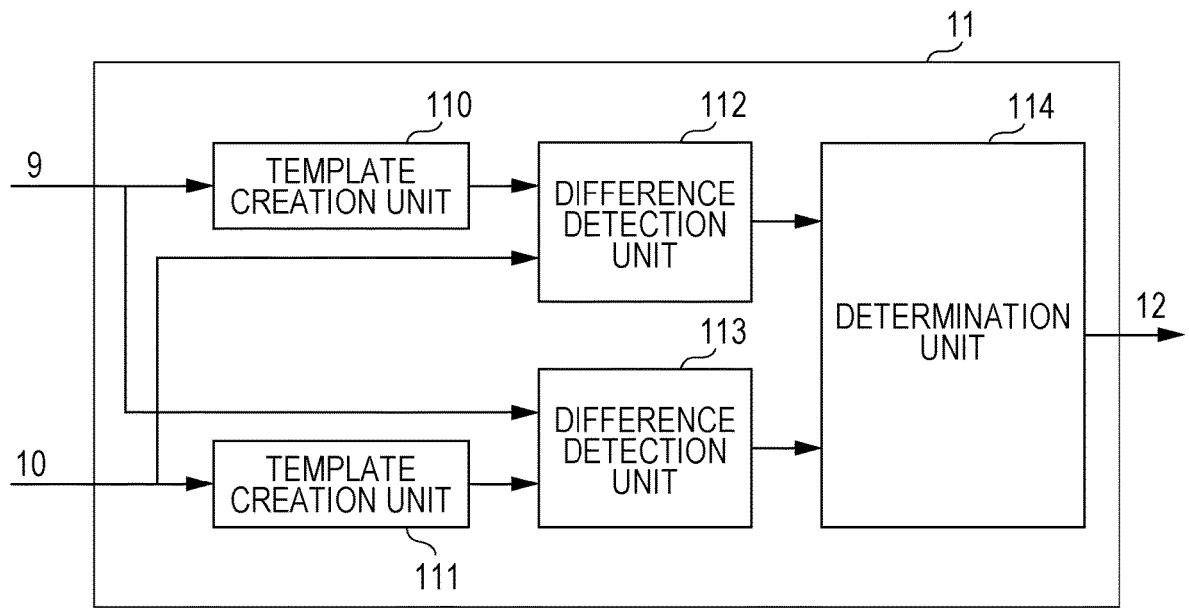
FIG. 6 is a diagram showing an embodiment of a comparison unit.
Figure 6:
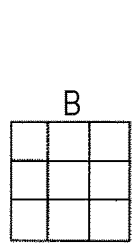
Figure 6:
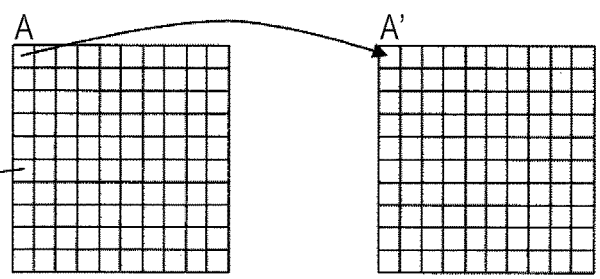

FIG. 6 shows an embodiment of the comparison unit. The comparison unit 11 can include template creation units 110 and 111, difference detection units 112 and 113, and a determination unit 114. In the template creation unit 110, a template is created from the design data prediction image from which the noise has been removed by the image correction unit 92.

The design data prediction image created from the SEM image may have a different line width even though the pattern shape of the design data image is the same, due to a prediction error by a manufacturing process variation.

For this reason, there is the possibility that a line width difference appears at the time of comparison with the design data image and it is erroneously determined as a defect, even in the case where there is no defect.

In order to prevent this, the template creation unit divides the design data prediction image into small local regions to create a template as shown in FIG. 7A. Here, a divided template B becomes a 3×3 pixel region as an example of a smallest template.

Using a template A obtained by dividing the design data prediction image into the local regions and the design data image, the difference detection unit 112 detects a matching degree of a region of a design data image A' corresponding to a position of the template A as shown in FIG. 7B. At this time, searching is performed within a range deviated by the manufacturing process variation around the region of the design data image A' to obtain a value (−1 to 1) having a highest matching degree.

As described above, by dividing the design data prediction image into the local regions to become a simple shape, it is possible to ignore a shape difference in a region relatively larger than the local region, which is caused by the difference in the line width. In addition, if searching is performed within the range deviated by the manufacturing process variation, it is possible to cover a position shift. Here, the calculation of the matching degree can be obtained by a normalized correlation or the like that is generally used frequently.

Figure 7C:
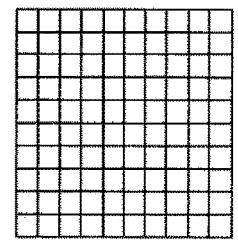

In addition, the value of the matching degree is stored as a value of a matching degree of a point corresponding to the position of the template A in FIG. 7C. Subsequently, a matching degree is obtained in the similar manner using a template next to the template A, matching degrees are obtained in all templates, and a matching degree image of FIG. 7C is created. Here, the template is divided into a 3×3 pixel region. However, the present invention is not limited to the 3×3 pixel region and the template may be divided into an n×m pixel region (n>0 and m>0). Further, it is considered that determination accuracy is improved by creating the template while shifting the template for each pixel with the template as the 3×3 pixel region and finely obtaining the matching degree for each pixel.

Like the template creation unit 110, the template creation unit 111 creates a template by dividing the design data image into small local regions this time. In addition, the difference detection unit 113 calculates a matching degree in a corresponding region of the design data prediction image in the template of the divided design data image. When the matching degree is calculated, it can be calculated in the similar manner to the difference detection unit 112.

Figure 8A:
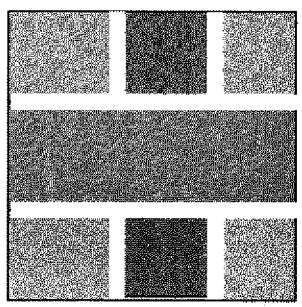
FIGS. 8A to 8C are diagrams showing an example of a design data image.
Figure 8B:
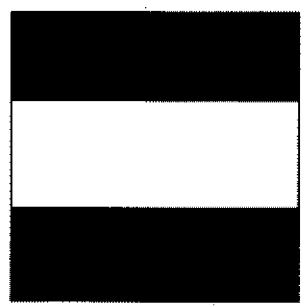
Figure 8C:
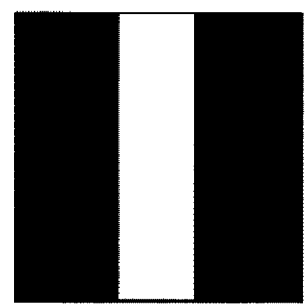
Figure 9A:
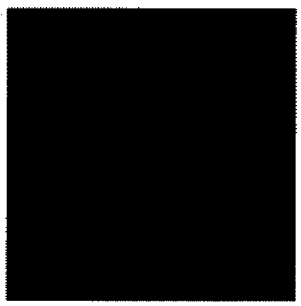
FIGS. 9A and 9B are diagrams showing an example of a difference image created by a difference detection unit.
Figure 9B:
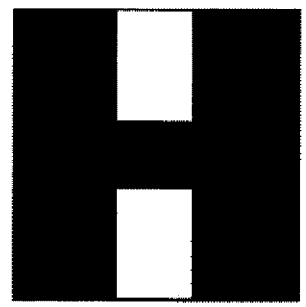

When the value (−1 to 1) of the matching degree image is normalized to 0 to 255 and an image in which a brightness value is inverted is taken as a difference image, for example, the design data prediction image is shown in FIG. 8B and the design data image corresponding to this is shown in FIG. 2B, a pattern shape is the same, so that a difference image is as shown in FIG. 9A. In addition, when the design data prediction image is shown in FIG. 8A and the design data image corresponding this is shown in FIG. 2A, in a pattern image, only a region where a difference is generated in the pattern becomes white as shown in FIG. 9B.

Figure 10:
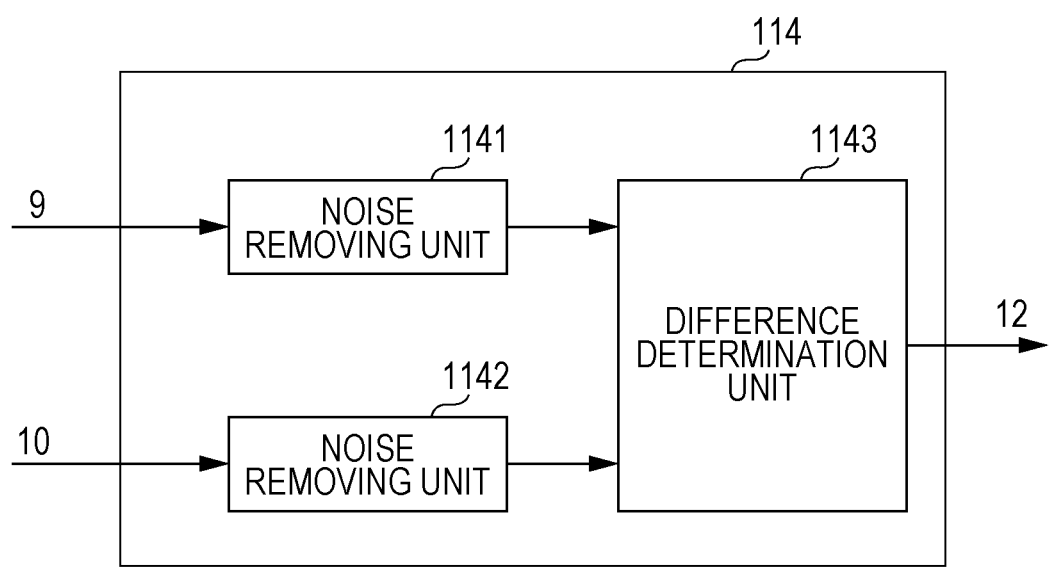
FIG. 10 is a diagram showing an embodiment of a determination unit.

FIG. 10 shows an embodiment of the determination unit. The difference image information detected by each of the difference detection units 112 and 113 is input to the determination unit 114. For each difference region, regions of small differences considered to be noise are detected and removed by noise removing units 1141 and 1142. At this time, an isolated point or an isolated block shown in FIG. 5B is detected and removed. In a difference determination unit 1143, presence/absence of a difference is determined on the basis of the size (pixel number) of the difference region, by using the difference image from which noise has been removed by the noise removing units 1141 and 1142. Here, when there is a difference when the size (pixel number) of the difference region of either the difference region output from the noise removing unit 1141 or the difference image output from the noise removing unit 1142 is larger than a specific value, it is determined that there is a difference and when the size (pixel number) of the difference region of each of the difference image output from the noise removing unit 1141 and the difference image output from the noise removing unit 1142 is equal to or smaller than a specific value, it is determined that there is no difference.

If there is a pattern in the vicinity of the image edge, there is a pattern in the design data due to expansion/contraction of the pattern by the manufacturing process, but it does not appear in the SEM image or conversely, the pattern does not appear in the design data. However, the pattern may appear in the SEM image. Therefore, even if there is a pattern difference at the image edge, it is unknown whether the difference is correct or not. Therefore, when there is a difference in the vicinity of the image edge and there is no difference in the other region, unknown determination may be output. For example, in this case, a message for requiring a user to perform visual confirmation may be sent.

Figure 11:
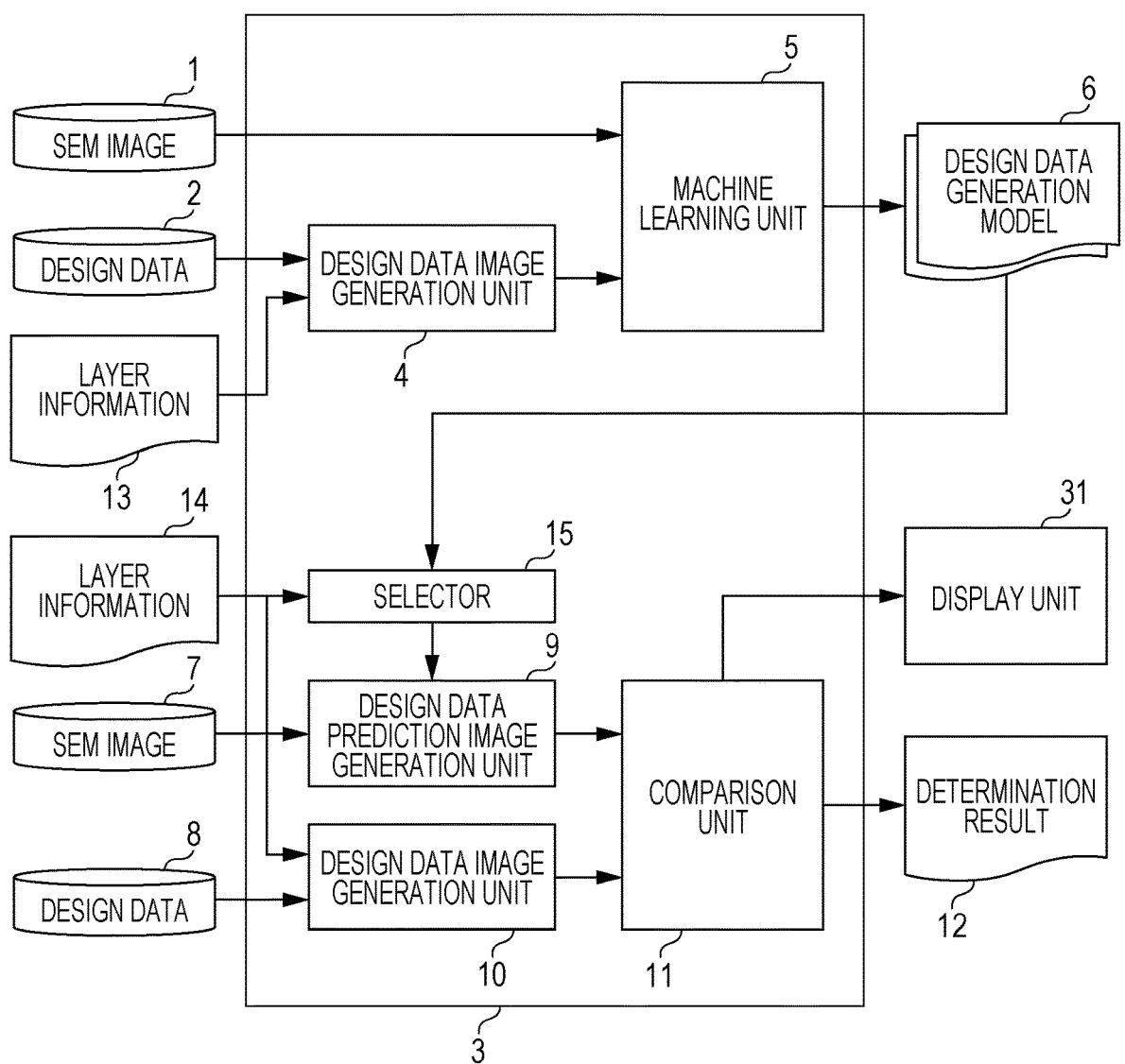
FIG. 11 is a diagram showing an embodiment of an image evaluation device.

Since a semiconductor pattern also has a multilayer pattern, a defect may be detected by using layer information as shown in FIG. 11. At the time of learning, when a design data image is generated from the design data 2 by the design data image generation unit 4, the design data generation model 6 is created by designating layers such as a first layer, a second layer, and a third layer using layer information 13. At the time of inspection, the design data generation model 6 of the layer designated by the layer information 14 is selected by a selector 15 and the pattern difference or the defect is detected in the similar manner to the image evaluation device 3 of FIG. 1. In the case where the defect is detected by using patterns of a plurality of layers, the design data generation model 6 is created for each of the plurality of layers at the time of learning, and at the time of inspection, the design data generation model 6 is divided for each layer at the time of inspection, it is determined whether there is a difference (defect) in the similar manner to the image evaluation device 3 of FIG. 1, and when it is determined that there is a difference (defect) in one or more layers as a result of determination in each layer, it is determined that there is the difference (defect).

Further, the design data also includes the layer information of the pattern, the design data generation model is created for each layer included in the design data, using the layer information, and at the time of inspection, similarly, when it is determined that there is a difference (defect) in one or more layers, it is determined that there is the difference (defect).

Figure 12:
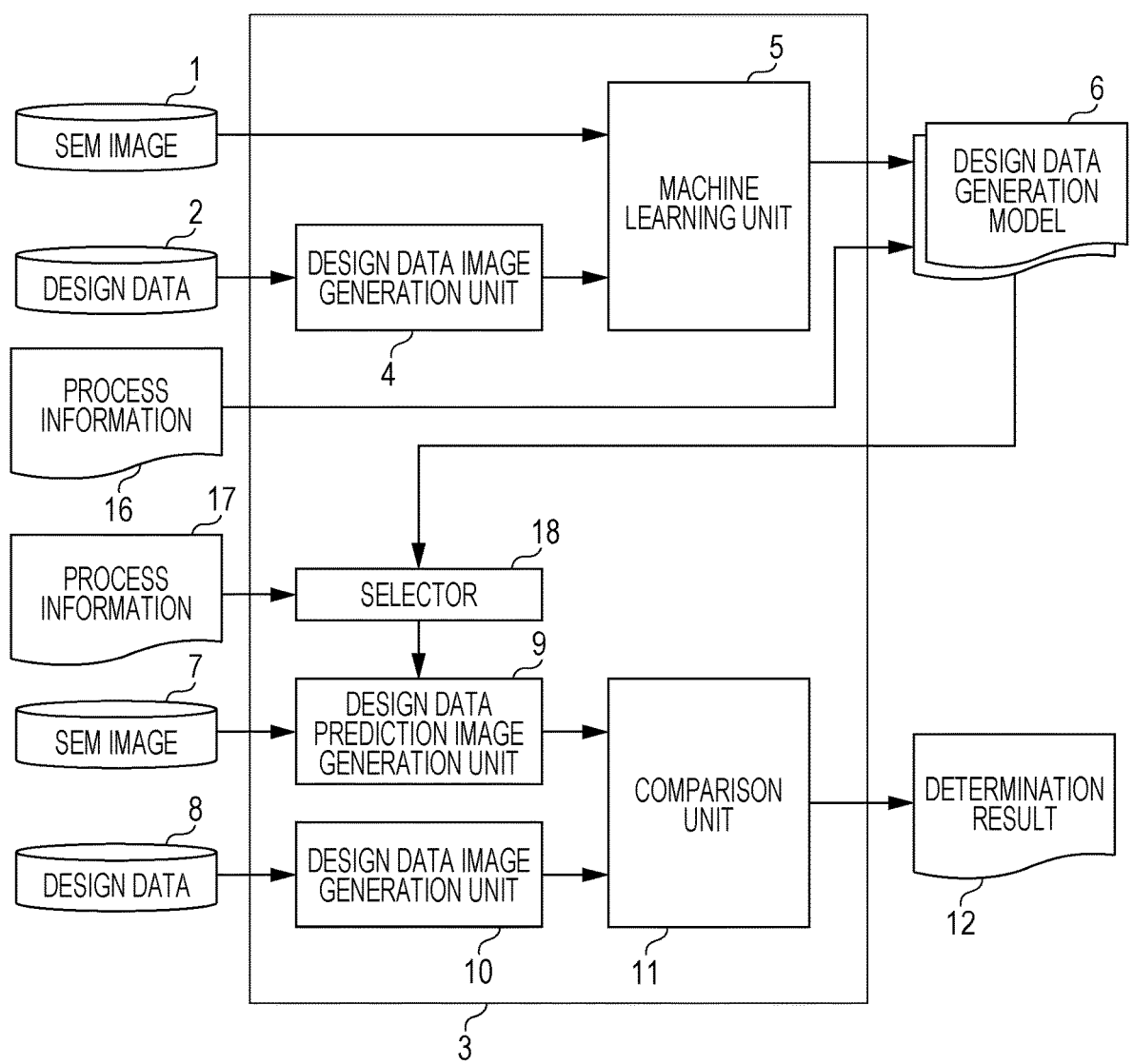
FIG. 12 is a diagram showing an embodiment of an image evaluation device.

Since the shape of the pattern also changes in the pattern of the semiconductor due to the manufacturing process, process information may be used as shown in FIG. 12. At the time of learning, when the design data image is generated from the design data 2 by the design data image generation unit 4, the design data generation model 6 in a designed process is created using process information 16 and at the time of inspection, the design data generation model 6 designated by process information 17 is selected by the selector 18 and a pattern difference or defect is detected in the similar manner to the image evaluation device 3 of FIG. 1. Further, a display unit 31 may be provided to display the defect detected by the comparison unit or to display the design data prediction image or the design data image in a superimposed state. Further, the image may be displayed in an easily understandable manner by putting a color on the region of the pattern difference.

Figure 13:
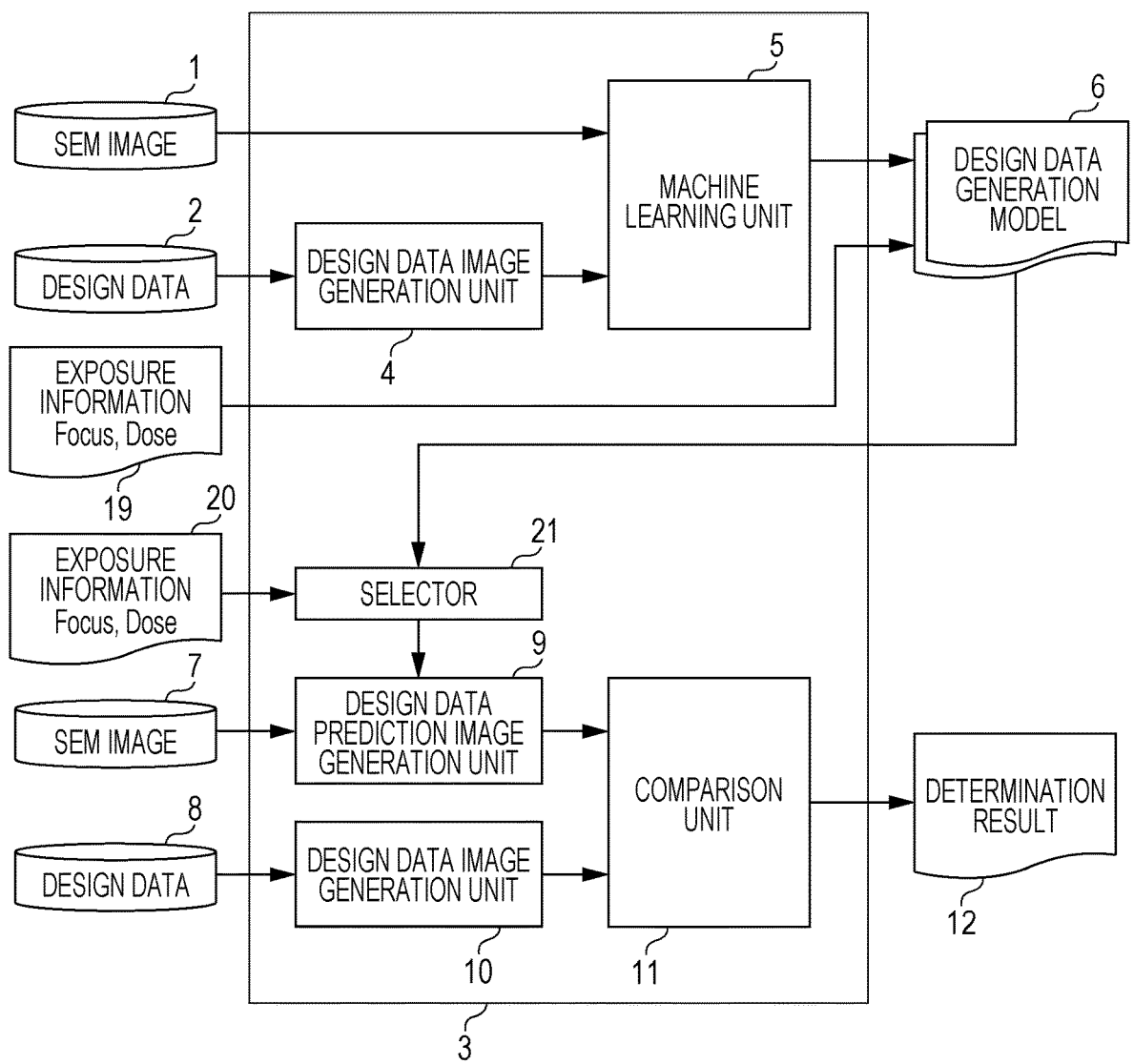
FIG. 13 is a diagram showing an embodiment of an image evaluation device.

Since the shape of the pattern also changes in the pattern of the semiconductor due to exposure information of Focus or an exposure amount (Dose) at the time of exposure, exposure information 19 may be used as shown in FIG. 13. At the time of learning, when the design data image is generated from the design data 2 by the design data image generation unit 4, the design data generation model 6 in designed exposure information is created using exposure information 19 and at the time of inspection, the design data generation model 6 designated by exposure information 20 is selected by the selector 21 and a pattern difference or defect is detected in the similar manner to the image evaluation device 3 of FIG. 1.

Figure 14:
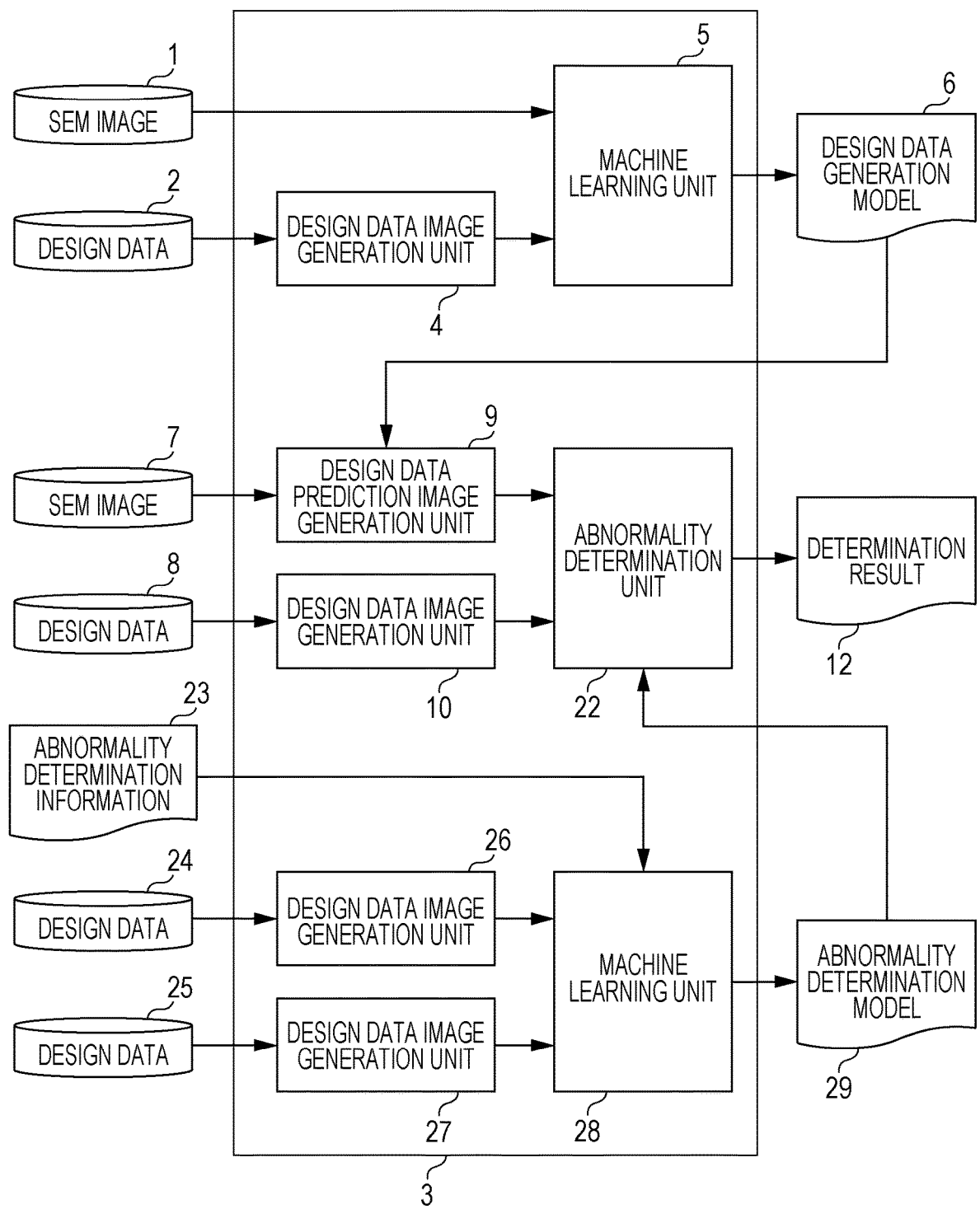
FIG. 14 is a diagram showing an embodiment of an image evaluation device.

Further, in the comparison unit 11, it is determined whether or not there is a defect is determined by threshold processing of the size (pixel number) of the difference region. However, machine learning may be used as shown in FIG. 14.

Here, there are two machine learning units, that is, a machine learning unit 5 for generating a design data image from the SEM image and a machine learning unit 28 for determining an abnormality using the design data prediction image predicted by it and the design data image. Since a mechanism for realizing the first machine learning unit 5 for generating the design data image from the SEM image is already described, the second machine learning unit 28 will be described. The machine learning unit 28 receives two design data images and learns whether or not there is a difference (abnormality) with abnormality determination information 23 as teacher data. Design data image generation units 26 and 27 are the same as the design data image generation unit 4.

For example, if the design data 24 and the design data 25 are the same, the abnormality determination information 23 has no abnormality and if the design data 24 and the design data 25 are different, the abnormality determination information 23 is abnormal. The machine learning unit 28 receives the design data images created from the two design data using the CNN and creates an abnormality determination model 29 for outputting teacher data based on the abnormality determination information 23. The CNN of the machine learning unit 28 can be realized by using a network called ResNet, for example. The abnormality determination unit 22 determines abnormality by the abnormality determination model, using the same network as the machine learning unit 28.

Figure 15:
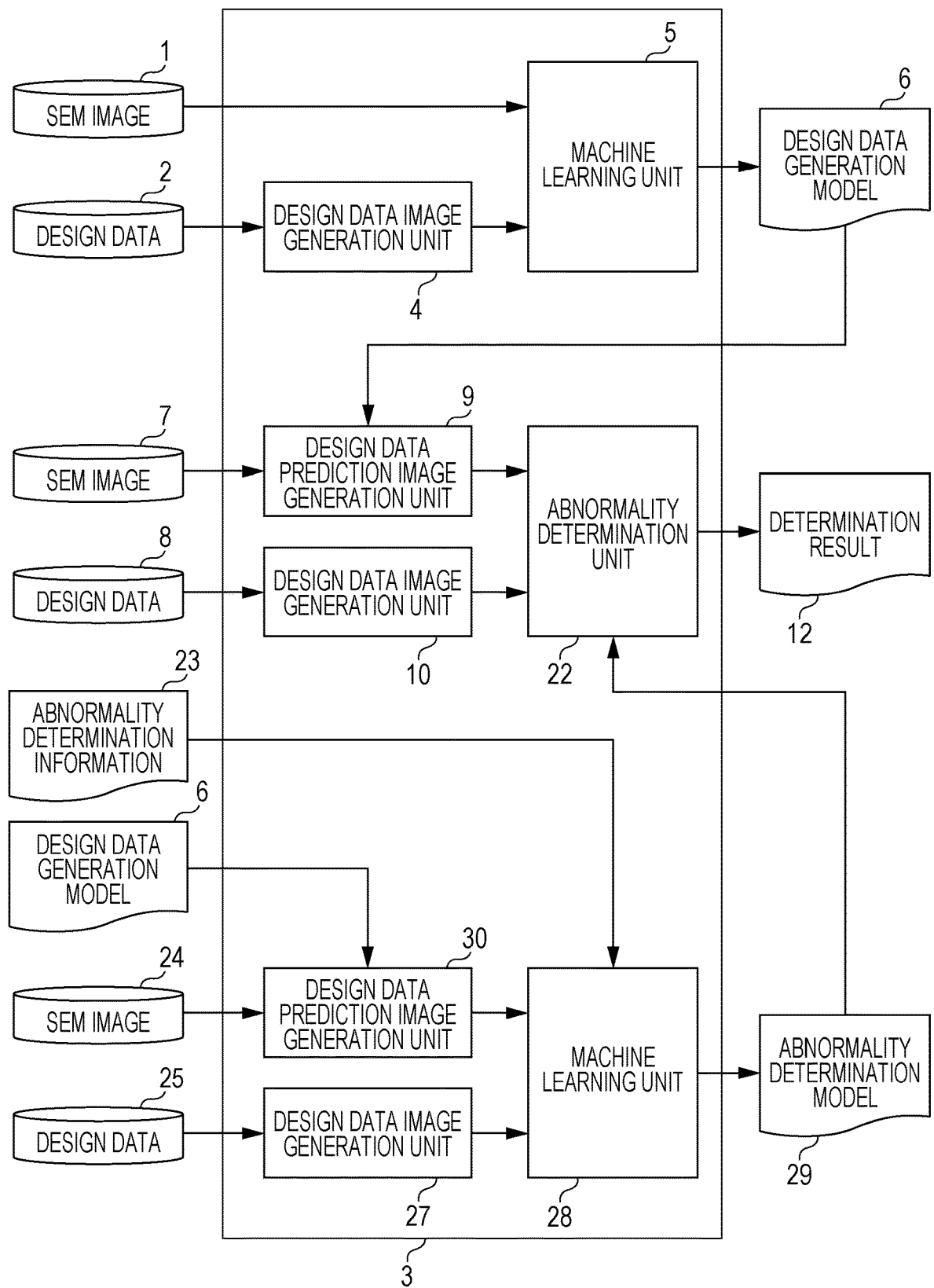
FIG. 15 is a diagram showing an embodiment of an image evaluation device.

In addition, as shown in FIG. 15, learning may be performed using the design data prediction image created by machine learning unit 5 instead of the design data. In this case, the design data image generation unit 26 of FIG. 14 changes to the design data prediction image generation unit 30. The design data prediction image generation unit 30 is the same as the design data prediction image generation unit 9 and can be realized by the same network as the machine learning unit 5 and generates the design data prediction image using the design data generation model. The other can be realized by the machine described in FIG. 14.

Although the embodiment of the image evaluation device have been described above, this may be performed processing by software processing.

Figure 16:
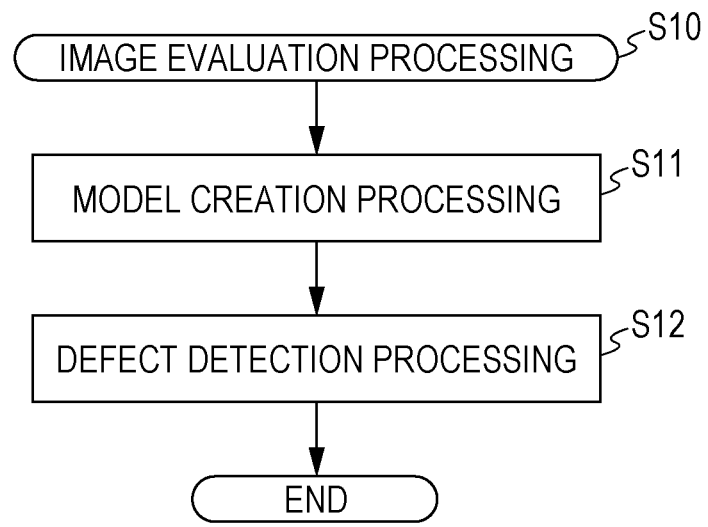
FIG. 16 is a diagram showing an embodiment of image evaluation processing.

An embodiment of image evaluation processing will be described using FIG. 16.

In image evaluation processing S10, model creation processing S11 and defect detection processing S12 are performed. In the model creation processing S11, a model for converting the SEM image into the design data image is created. In the defect detection processing S12, a design data image predicted from the SEM image is created using the model created in the model creation processing S11, an original design data image corresponding to the SEM image is compared with the predicted design data image, and a defect is detected.

Figure 17:
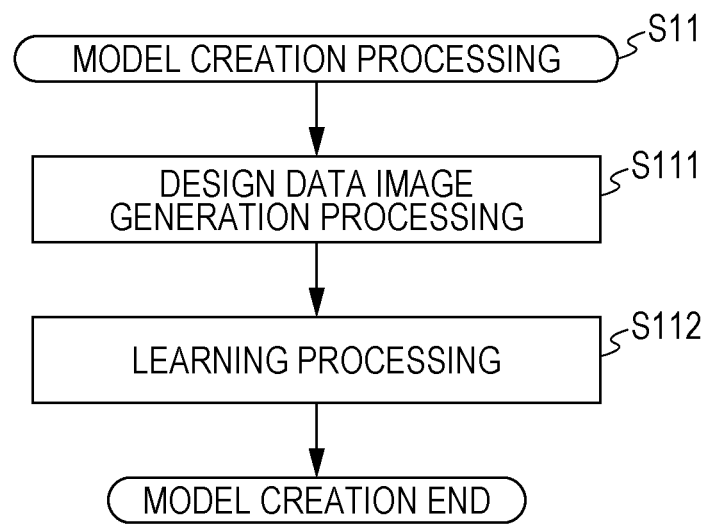
FIG. 17 is a diagram showing an embodiment of model creation processing.

An embodiment of the model creation processing S11 will be described using FIG. 17. The model creation processing includes design data image generation processing S111 and learning processing S112. In the design data image generation processing S111, the closed figure of the pattern is created by connecting the vertexes by the lines in the order of enumeration of the vertex coordinates of the pattern of the design data, the region having the pattern is displayed with a white color, the region having no region is displayed with a black region, and the design data image is created as a binary image. In the learning processing S112, a model for converting the SEM image into the design data image is created using machine learning. A design data image obtained by imaging the target SEM image and design data corresponding to the SEM image is used as the teacher data. Specifically, machine learning calculates a weight (model) of a filter for converting the SEM image into the design data image using the CNN such as VGG16 and SegNet that can identify the image in pixel units.

Figure 18:
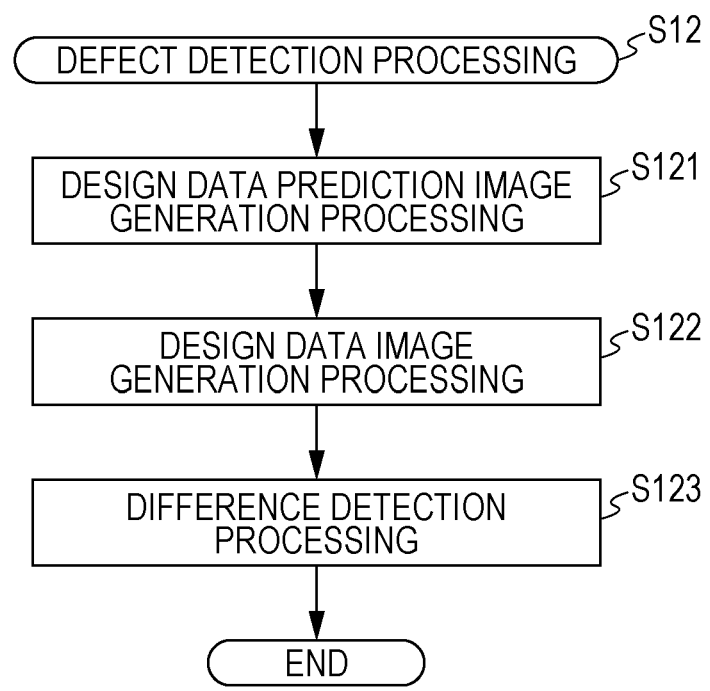
FIG. 18 is a diagram showing an embodiment of defect detection processing.

An embodiment of the defect detection processing S12 will be described using FIG. 18. The defect detection processing S12 includes design data prediction image generation processing S121, design data generation processing S122, and difference detection processing S123. In the design data prediction image generation processing S121, a design data prediction image predicted from the SEM image is created using the model created in the model generation processing. In the design data image generation processing S122, the design data is imaged by the same processing as the design data image generation processing S111 to create a design data image.

In the difference detection processing S123, the design data prediction image predicted from the SEM image and the design data image corresponding to the design data prediction image are compared and a difference region having a difference in the pattern is detected. If there is the difference region, it is determined as a defect and if there is no difference, it is determined as normality, thereby realizing the difference detection processing.

Figure 21:
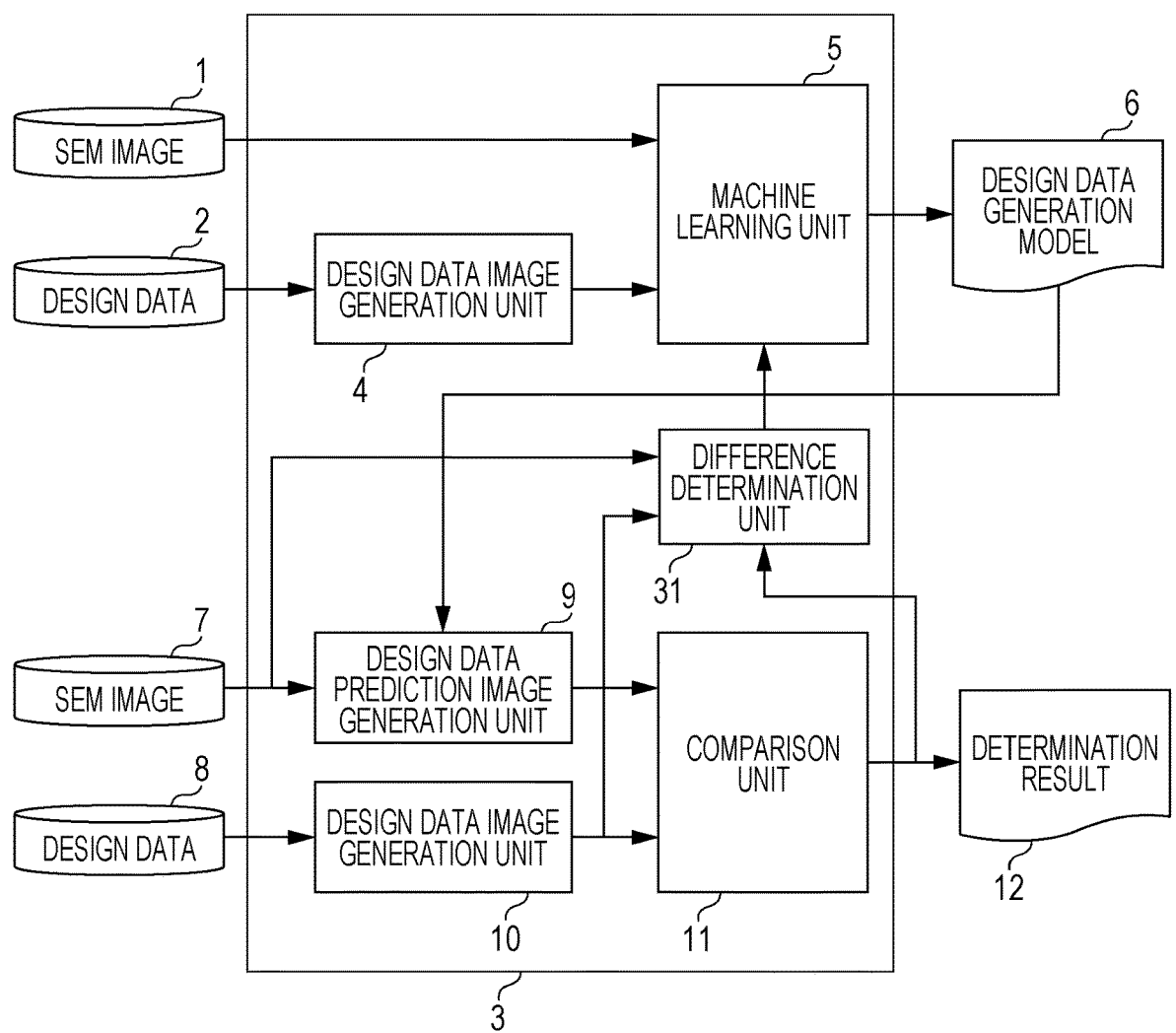
FIG. 21 is a diagram showing an embodiment of image evaluation processing.

In order to strengthen the learning model, additional learning may be necessary. FIG. 21 shows a configuration for strengthening the learning model on the basis of the image determination result of the inspection target. The image evaluation device includes a difference determination unit 31 that determines whether to use or not to use the SEM image 7 and the design data 8 as additional learning data, from a comparison result of the two images created on the basis of the SEM image 7 of the inspection target and the design data 8 corresponding to the SEM image 7, compared by the comparison unit 11. The difference determination unit 31 can be realized by a selector.

When it is determined that there is no difference in the comparison unit 11, the SEM image 7 of the inspection target and the design data 8 corresponding to the SEM image 7 are used as the additional learning data and additional learning is performed by the machine learning unit 5. Conversely, when it is determined that there is a difference in the comparison unit 11, the SEM image 7 and the design data 8 are not used as the additional learning data As a result, the design data generation model can always be updated with a more accurate design data generation model suitable for the image data used in the inspection.

A learning sequence when learning is performed is shown in FIG. 22. A learning sequence S20 is a sequence for performing learning automatically. In a new inspection check S21, data such as an inspection target device name and an inspection recipe is checked and it is determined whether or not an inspection target has been learned in the past. The inspection target device name may be checked on the basis of supplementary information such as a file or design data created by the user or the evaluation device, for example, information of another file describing names and information. Data such as the inspection recipe can be checked on the basis of photographing conditions and the like. When it is determined that the inspection is as a new inspection in the new inspection check S21, the imaging coordinates are generated in photographing coordinate generation S23 for acquiring an image for generating learning data. Here, the photographing shooting coordinates may be randomly generated. Further, the coordinates of a defect or the like obtained in advance may be used. The photographing coordinates may be generated by a position of a different pattern shape so that image photographing can be performed comprehensively for a variation of the pattern shape, for example, on the basis of the pattern shape by using the design data. The photographing recipe is generated in photographing recipe generation S24 using the photographing coordinates obtained in the photographing coordinate generation S23 and image photographing is performed in photographing S25. In addition, position matching is performed by pattern matching of the images in the photographing image and the design drawing in pattern matching S26 with the design drawing, using the photographing image, and learning is performed in learning S27 using the design drawing and the photographing image after the position matching to generate a model. The processing for the number of photographing images of the photographing recipe generated in the photographing recipe generation S24 is repeated. If the inspection is not the new inspection in the new inspection check S21, the process ends. As a result, learning data can be added automatically and inspection performance can be improved. In addition, it is necessary to generate a new model due to the change in the inspection target pattern or it is necessary to update the model by additional learning.

Figure 23:
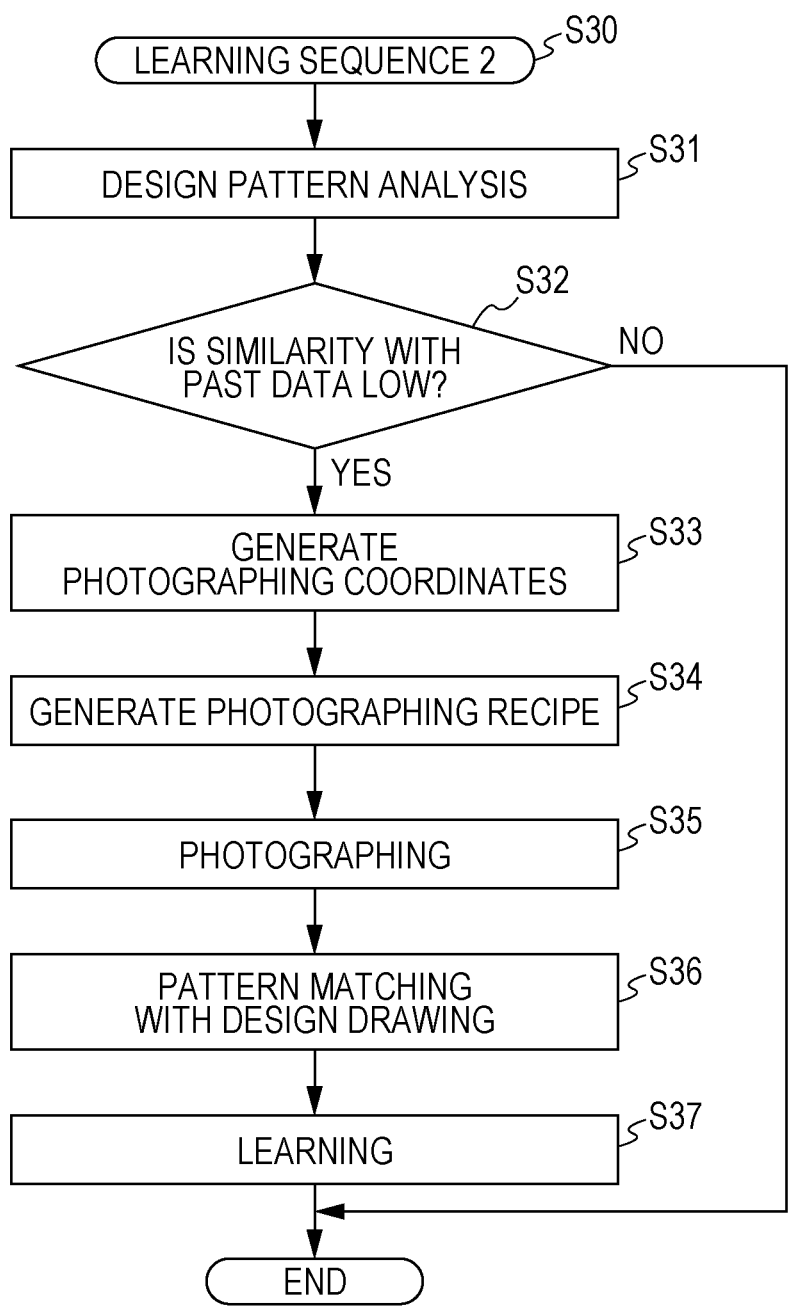
FIG. 23 is a diagram showing an embodiment of a learning sequence.

FIG. 23 shows a learning sequence S30 for performing learning on the basis of design pattern analysis. In design pattern analysis S31, similarity between design data used for the inspection and design data learned in the past is estimated. The similarity is, for example, a matching degree of the number of circuit diagrams included in the design data, the number of line segments constituting a circuit, the density of lines, and a circuit shape. A method of calculating the matching degree between the two pieces of data as described above can be estimated by using a normalized correlation that is known technology. When the similarity falls below a certain threshold, the photographing coordinates are generated in photographing coordinate generation S33 using the coordinates of the design data and a photographing recipe is created in photographing recipe generation S34. A photographing image is acquired in in photographing S35 on the basis of the photographing recipe, position matching between the photographing image and the design data is performed in matching S36 with a design drawing, and an additionally learned model is updated in learning S37 using the design data and the photographing image after the position matching. As a result, learning data can be added automatically and inspection performance can be improved.

In the learning sequences of FIGS. 22 and 23, the new model may be created on the basis of the inspection target or the model may be updated by additional learning.

In addition, depending on the device and the photographing conditions, the appearance of the photographing image may change. In this case, in the image generated by the design data image generation unit 10 in which a position where there is a pattern is displayed with a white color, the difference may not be correctly detected.

Therefore, FIG. 24 shows an embodiment of an image evaluation device that uses a photographing condition or device information.

In the design data image generation units 4 and 10, by changing a drawing method of the design drawing according to a photographing condition of an inspection image of photographing condition device information 32 or processing information of the device, an image close to the appearance of the inspection image can be created from the design data and prediction accuracy of the design data can be enhanced.

For example, in the case where the inspection target device is a pattern after etching processing as shown in FIG. 25A and the image of the inspection device is a BSE (reflected electron image) photographing image as shown in FIG. 25B, a brightness value of a groove (concave) portion of the pattern becomes smaller than a brightness value of the other (convex) portion. Therefore, at the time of drawing the design data, the brightness value of the groove portion of the pattern is set to be smaller than the brightness vale of the other portion, so that a design data image close to the appearance of the BSE photographing image can be generated. When the inspection target device is a pattern after lithography and the image of the inspection device is an SE image (secondary electron image) as shown in FIG. 25C, a white image is obtained in only an edge portion of the pattern.

Therefore, the design data is drawn so as to set the brightness of the edge portion of the pattern to be higher than the brightness of the other region at the time of drawing the design data, so that a design data image close to the appearance of the inspection image can be generated.

Further, the brightness becomes high depending on a material in the BSE and the place of the material may appear white.

As described above, the drawing method of the design data is changed on the basis of the imaging condition of the inspection image or the device information (the processing information or the material of the device that is the information on the device), so that prediction accuracy of the design data can be improved. Here, the photographing condition is a condition relating to photographing and shows a detection method (the BSE image, the SE image, and a combined image thereof), a frame accumulation number, a photographing magnification, or an image size, for example.

Figure 27:
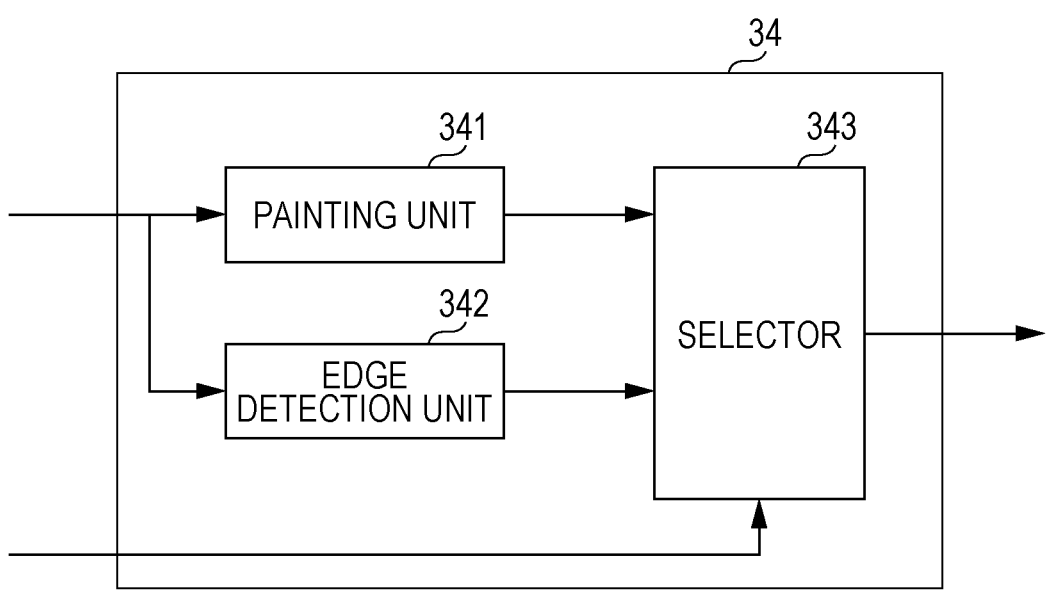
FIG. 27 is a diagram showing an embodiment of a design data image generation unit.

As shown in FIG. 27, the design data generation unit 34 includes a painting unit 341 and an edge detection unit 342. For example, in the case of the BSE photographing image as shown in FIG. 25B, an output of the painting unit 341 is selected by a selector 343 and in the case of the SE image as shown in FIG. 25C, the output of the edge detection unit 342 is selected and output.

In the painting unit 341, similar to the design data image generation unit of FIG. 1, a closed figure is created on the basis of the vertex coordinates of the design data, a region where there is a pattern is painted white, a region where there is no pattern is painted black, and an image is created. In the edge detection unit 342, a closed figure is created on the basis of the vertex coordinates of the design data, a line (edge) of the closed figure is displayed with a white color, the other is displayed with a black color, and an image is created. A width of the line of the closed figure is not limited to one pixel and it may be created with a width of several pixels.

Figure 26:
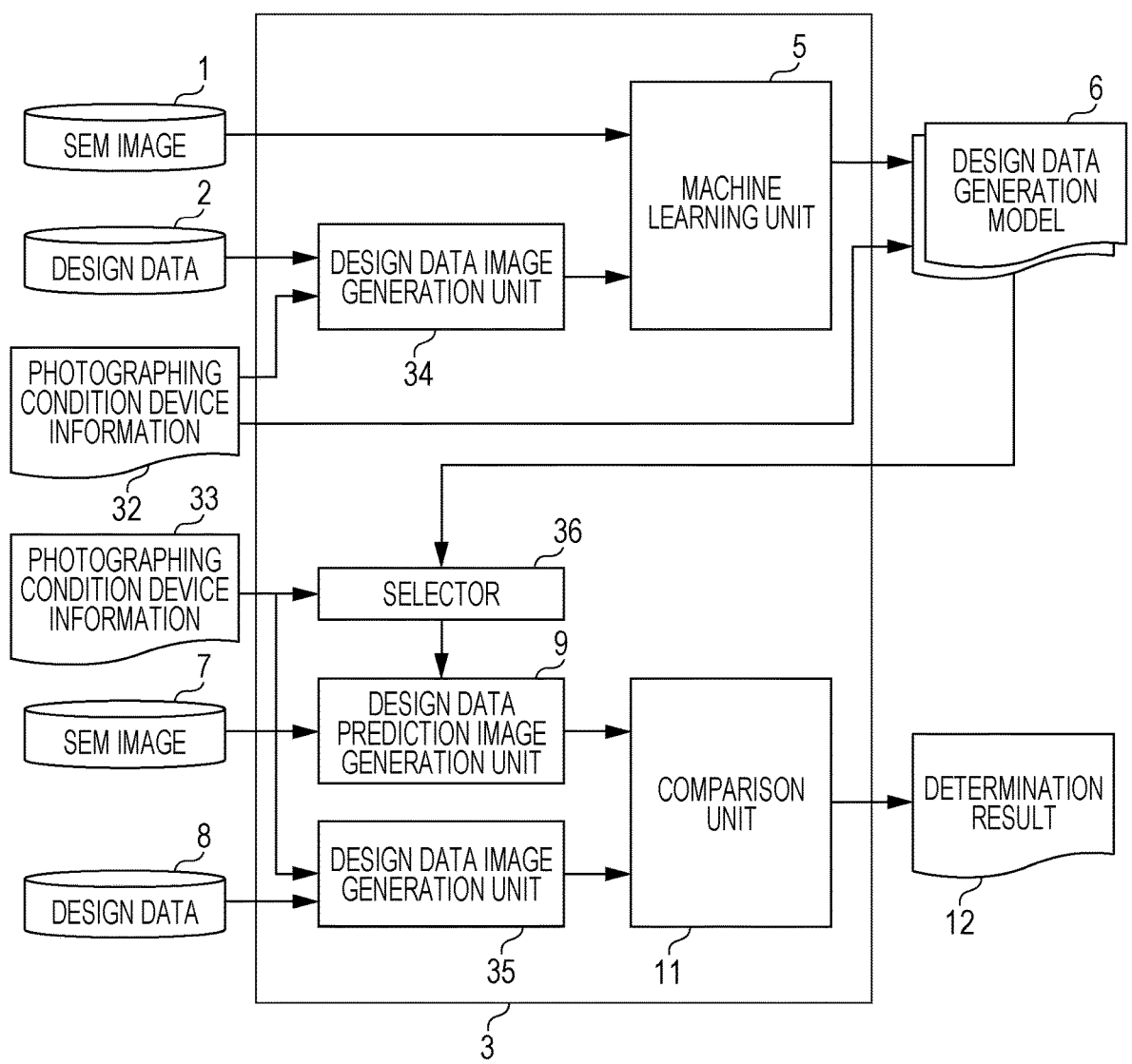
FIG. 26 is a diagram showing an embodiment of image evaluation processing.

In addition, as shown in FIG. 26, a model may be separately created according to the photographing condition device information 32 and at the time of inspection, a model may be selected and used according to photographing condition device information 33. In this case, supplementary information that can correspond to the photographing condition device information 32 is added to the design data generation model created on the basis of the photographing condition device information 32 and when the inspection is performed, a design data generation model corresponding to the photographing condition device information 32 is selected by a selector 36 using the information.

According to the embodiment described above, by reverse engineering using the machine learning, the image of the inspection target pattern deformed due to a manufacturing process factor is returned to the design data image and comparison is performed in a state where the deviation of the shape is small, as a result, the defect can be accurately detected.

In the machine learning, instead of detecting a defect, learning for returning the inspection target pattern deformed due to the manufacturing process factor to the design data image is performed. Therefore, an normal image and design data corresponding to the normal image may be used and a defect pattern image is not necessary.

As a result, it is possible to detect a systematic defect without using a defect image and generating misinformation frequently.

What is claimed is:

1. An image evaluation device comprising:
   a machine learning unit that creates a model for generating a design data image from a design data corresponding to an inspection target image;
   a design data prediction image generation unit that predicts the design data image from the inspection target image, using the model created by the machine learning unit;
   a design data image generation unit that generates the design data image from the design data corresponding to the inspection target image; and
   a comparison unit that compares a design data prediction image generated by the design data prediction image generation unit and the design data image.

2. The image evaluation device according to claim 1, wherein,
   the machine learning unit creates the model for generating the design data image from the inspection target image for each layer of a plurality of layers of an inspection pattern, using layer information and a teacher design data image as a teacher and using an inspection target image corresponding to the layer information and the teacher design data image;
   a selecting unit selects the model created by the machine learning unit according to the layer information; and
   the design data prediction image generation unit predicts the design data image from the inspection target image, using the model selected by the selecting unit.

3. The image evaluation device according to claim 2, further comprising:
   a graphical user interface (GUI) that sets the layer information, process information of a manufacturing process, or exposure information of an image scanning beam or displays the design data prediction image corresponding to the layer information, the process information, or the exposure information and generated by the design data prediction image generation unit.

4. The image evaluation device according to claim 1, wherein:
   the machine learning unit creates the model for generating the design data image from the inspection target image for each process of a plurality of manufacturing processes, using process information of the plurality of manufacturing processes and a teacher design data image as a teacher and using an inspection target image corresponding to the process information and the teacher design data image;
   a selecting unit selects the model created by the machine learning unit according to the process information; and
   the design data prediction image generation unit predicts the design data image from the inspection target image, using the model selected by the selecting unit.

5. The image evaluation device according to claim 1, wherein:
   the machine learning unit creates the model for generating the design data image from the inspection target image for each exposure information of a plurality of exposures of an image scanning beam, using the exposure information and a teacher design data image as a teacher and using an inspection target image corresponding to the exposure information and the teacher design data image;

a selecting unit selects the model created by the machine learning unit according to the exposure information; and the design data prediction image generation unit predicts the design data image from the inspection target image using the model selected by the selecting unit.

6. The image evaluation device according to claim 1, further comprising:
an abnormality determination unit that determines an abnormality of an inspection target pattern.

7. The image evaluation device according to claim 6, further comprising:
the abnormality determination unit that determines the abnormality using a design data prediction image generated by the design data prediction image generation unit, the design data image, and an abnormality determination model;
the design data image generation unit that includes first and second design data image generation units that generate design data images; and
the machine learning unit that creates the abnormality determination model using the design data images generated by the first and second design data image generation units and abnormality determination information.

8. The image evaluation device according to claim 6, wherein:
a defect and an unknown are distinguished by an image region of a pixel determined as an abnormality.

9. The image evaluation device according to claim 8, wherein, when there is a region determined as an abnormality in only an image region of an image edge, it is determined that a presence or an absence of the defect is unknown and when there is a region determined as an abnormality in an image region other than the image edge, it is determined that there is a defect.

10. The image evaluation device according to claim 1, further comprising:
a graphical user interface (GUI) that displays the design data prediction image generated by the design data prediction image generation unit.

11. The image evaluation device according to claim 1, further comprising;
in the comparison unit, the design data prediction image, the design data image, or both the design data prediction image and the design data image are divided into local regions to create a template, an image range corresponding to a local region of another image is matched to obtain a matching degree, and a comparison result of the images is calculated by adjusting the matching degree in the local regions.

12. An image evaluation method for detecting a defect using an inspection target pattern and design data, comprising:
by a design data image generation unit, imaging design data;
by a machine learning unit, creating a model for generating a design data image from a design data corresponding to an inspection target image;
by a design data prediction image generation unit, predicting the design data image from the inspection target image, using the model created by the machine learning unit;
by a design data image generation unit, generating the design data image corresponding to the inspection target image; and by a comparison unit, comparing a design data prediction image generated by the design data prediction image generation unit and the design data image.

13. The image evaluation method according to claim 12, further comprising:
by the machine learning unit, creating the model for generating the design data image from the inspection target image for each layer of a plurality of layers of an inspection pattern, using layer information and a teacher design data image as a teacher and using an inspection target image corresponding to the layer information and the teacher design data image;
by a selecting unit, selecting the model created by the machine learning unit according to the layer information; and
by the design data prediction image generation unit, predicting the design data image from the inspection target image, using the model selected by the selecting unit.

14. The image evaluation method according to claim 12, further comprising:
by the machine learning unit, creating the model for generating the design data image from the inspection target image for each process of a plurality of manufacturing processes, using process information of the plurality of manufacturing processes and a teacher design data image as a teacher and using an inspection target image corresponding to the process information and the teacher design data image;
by a selecting unit, selecting the model created by the machine learning unit according to the process information; and
by the design data prediction image generation unit, predicting the design data image from the inspection target image, using the model selected by the selecting unit.

15. The image evaluation method according to claim 12, further comprising:
by the machine learning unit, creating the model for generating the design data image from the inspection target image for each exposure information of a plurality of exposures of an image scanning beam, using the exposure information and a teacher design data image as a teacher and using an inspection target image corresponding to the exposure information and the teacher design data image;
by a selecting unit, selecting the model created by the machine learning unit according to the exposure information; and
by the design data prediction image generation unit, predicting the design data image from the inspection target image using the model selected by the selecting unit.

16. The image evaluation method according to claim 12, further comprising:
by an abnormality determination unit, determining abnormality of the inspection target pattern.

17. The image evaluation method according to claim 12, further comprising:
by first and second design data image generation units, imaging the design data; and
by the machine learning unit, creating an abnormality determination model using a design data image generated by the first and second design data image generation units and abnormality determination information.

18. The image evaluation method according to claim 12, further comprising:
- by an abnormality determination unit, determining an abnormality using the design data prediction image generated by the design data prediction image generation unit, the design data image, and an abnormality determination model;
- by first and second design data image generation units, imaging the design data; and
- by the machine learning unit, creating the abnormality determination model using a design data image generated by the first and second design data image generation units and abnormality determination information.

\* \* \* \* \*